United States Patent
Grove

(10) Patent No.: US 12,378,919 B2
(45) Date of Patent: Aug. 5, 2025

(54) DIRECT HORSEPOWER AND TORQUE MEASUREMENT SYSTEM FOR GAS TURBINE ENGINE

(71) Applicant: RTX Corporation, Farmington, CT (US)

(72) Inventor: Donald E. Grove, Glastonbury, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/472,659

(22) Filed: Sep. 22, 2023

(65) Prior Publication Data

US 2025/0101922 A1    Mar. 27, 2025

(51) Int. Cl.
  *F02C 7/32*    (2006.01)
  *F02C 9/16*    (2006.01)
  *F02C 9/20*    (2006.01)

(52) U.S. Cl.
  CPC .............. *F02C 9/20* (2013.01); *F02C 7/32* (2013.01); *F02C 9/16* (2013.01)

(58) Field of Classification Search
  CPC .... F02C 7/042; F02C 7/32; F02C 7/36; F02C 3/04; F02C 9/28; F02C 9/44
  See application file for complete search history.

(56) References Cited

U.S. PATENT DOCUMENTS

| | | | |
|---|---|---|---|
| 8,099,227 B2 | 1/2012 | Shafique et al. | |
| 9,732,625 B2* | 8/2017 | Cai | G05B 13/048 |
| 10,975,717 B2 | 4/2021 | Moniz et al. | |
| 11,913,342 B1* | 2/2024 | Coutu | F02C 9/20 |
| 2008/0319684 A1* | 12/2008 | Parrish | G01L 3/109 |
| | | | 702/43 |
| 2013/0098042 A1 | 4/2013 | Frealle et al. | |
| 2016/0138418 A1 | 5/2016 | Brummel et al. | |
| 2016/0178464 A1* | 6/2016 | Burns | F02C 3/10 |
| | | | 73/112.01 |
| 2016/0281528 A1 | 9/2016 | Penda et al. | |
| 2017/0167287 A1* | 6/2017 | Jacobs | G01L 25/003 |
| 2018/0171816 A1* | 6/2018 | Moniz | F01D 17/04 |
| 2019/0155318 A1* | 5/2019 | Meunier | F02C 9/28 |
| 2020/0308974 A1* | 10/2020 | Hosaka | F01D 17/162 |

FOREIGN PATENT DOCUMENTS

| | | |
|---|---|---|
| EP | 3034812 B1 | 4/2022 |
| EP | 3489485 B1 | 4/2022 |

OTHER PUBLICATIONS

Extended European Search Report corresponding to EP Application No. 24201936.2; Issue date, Feb. 21, 2025, 9 pages.

* cited by examiner

*Primary Examiner* — Thuyhang N Nguyen
(74) *Attorney, Agent, or Firm* — CANTOR COLBURN LLP

(57) ABSTRACT

A sensor arrangement for a gas powered turbine includes at least one sensor disposed on a power extraction shaft and configured to output a measured power extraction of the power extraction shaft. A controller is in communication with the at least one sensor. The controller includes a memory and a processor. The memory stores instructions for causing the processor to respond to a received measured power extraction of the power extraction shaft by synthesizing an instantaneous engine power output and engine efficiency and adjusting at least one parameter of the engine based on the synthesized engine power output and engine efficiency.

20 Claims, 3 Drawing Sheets

No Technical Data

DIRECT HORSEPOWER AND TORQUE MEASUREMENT SYSTEM FOR GAS TURBINE ENGINE

BACKGROUND

Exemplary embodiments of the present disclosure pertain to the art of engine parameter monitoring within a gas turbine engine, and more specifically to direct measuring of torque and horsepower of shaft within the gas turbine engine.

Gas powered turbines, such as those utilized within aircraft engines, ingest ambient air and compress the air in a series of compressor stages. The compressed air is provided to a combustor where it is mixed with a fuel and ignited. The resultant combustion products are provided to a turbine where the combustion products are expanded. The expansion of the combustion products drives rotation of the turbine. The rotation of the turbine in turn drives rotation of the compressor via the utilization of one or more shafts.

Engine operations are typically controlled by one or more full authority digital engine (FADEC) controller(s) that control engine operations by adjusting engine parameters using mathematical engine models.

BRIEF DESCRIPTION

Disclosed is a sensor arrangement for a gas powered turbine including at least one sensor disposed on a power extraction shaft and configured to output a measured power extraction of the power extraction shaft, a controller in communication with the at least one sensor, the controller including a memory and a processor, the memory storing instructions for causing the processor to respond to a received measured power extraction of the power extraction shaft by synthesizing an instantaneous engine power output and engine efficiency and adjusting at least one parameter of the engine based on the synthesized engine power output and engine efficiency.

In addition to one or more of the features described above, or as an alternative to any of the foregoing embodiments, the at least one sensor is disposed on a tower shaft, the tower shaft being interfaced with a turbine shaft of the gas powered turbine via a gear system.

In addition to one or more of the features described above, or as an alternative to any of the foregoing embodiments, the at least one engine parameter includes a variable vane angle of at least one compressor stage.

In addition to one or more of the features described above, or as an alternative to any of the foregoing embodiments, the at least one sensor is disposed on an aircraft mounted accessory drive shaft.

In addition to one or more of the features described above, or as an alternative to any of the foregoing embodiments, the at least one engine parameter includes a variable blade angle of a plurality of fan blades in at least one stage of a fan of the gas powered turbine.

In addition to one or more of the features described above, or as an alternative to any of the foregoing embodiments, the at least one sensor is at least one of a torque sensor and a horsepower sensor.

In addition to one or more of the features described above, or as an alternative to any of the foregoing embodiments, the at least one sensor is in wireless communication with the power extraction shaft.

In addition to one or more of the features described above, or as an alternative to any of the foregoing embodiments, the engine power is synthesized using a control model including inputs of at least one measured power extraction, the at least one measured power extraction being sourced from a singular component attached to the power extraction shaft, with a power extraction of a remainder of components extracting power via the power extraction shaft being synthesized.

In addition to one or more of the features described above, or as an alternative to any of the foregoing embodiments, the gas powered turbine is a geared turbofan aircraft engine.

Also disclosed is a gas powered turbine including a primary fluid flowpath connecting a compressor section, a combustor section, and a turbine section, the compressor section including a first compressor and a second compressor, with the second compressor operating at a higher pressure than the first compressor, the turbine section including a first turbine and a second turbine with the second turbine operating at a higher pressure than the first turbine, a first shaft connecting the first compressor section with the first turbine section, such that rotation of the first turbine section drives rotation of the first compressor section, a second shaft connecting the second compressor section with the second turbine section, such that rotation of the second turbine section drives rotation of the first compressor section, a first power extraction shaft interfaced with one of the first shaft and the second shaft, such that rotation of the one of the first shaft and the second shaft is translated to the first power extraction shaft, a first sensor disposed on the first shaft and configured to monitor and output a measured power extraction of the first power extraction shaft, and a controller in communication with the first sensor, the controller including a processor and a memory with the memory storing instructions for causing the processor to respond to a received measured power extraction of the first power extraction shaft by synthesizing an instantaneous engine power output and engine efficiency based on the measured power extraction of the first power extraction shaft and adjusting at least one parameter of the engine based on the synthesized engine power output and engine efficiency.

In addition to one or more of the features described above, or as an alternative to any of the foregoing embodiments, the gas power turbine includes a second power extraction shaft, the second power extraction shaft being interfaced with the other of the first shaft and the second shaft such that rotation of the other of the first shaft and the second shaft is translated to the second power extraction shaft, and a second sensor disposed on the second shaft and configured to monitor and output a measured power extraction of the second power extraction shaft.

In addition to one or more of the features described above, or as an alternative to any of the foregoing embodiments, synthesizing an instantaneous engine power output and engine efficiency is further based on the measured power extraction of the second power extraction shaft.

In addition to one or more of the features described above, or as an alternative to any of the foregoing embodiments, the engine power is synthesized using a control model including inputs of at least one measured power extraction, the at least one measured power extraction being sourced from a singular component attached to the power extraction shaft, with a power extraction of a remainder of components extracting power via the power extraction shaft being synthesized.

In addition to one or more of the features described above, or as an alternative to any of the foregoing embodiments, the first power extraction shaft is a tower shaft interfaced with the second shaft via a gear system.

In addition to one or more of the features described above, or as an alternative to any of the foregoing embodiments, the first sensor is at least one of a torque sensor and a horse power sensor, and wherein the at least one parameter of the engine is a variable vane angle of at least one compressor stage in the compressor section.

In addition to one or more of the features described above, or as an alternative to any of the foregoing embodiments, the first power extraction shaft is an aircraft mounted accessory drive shaft.

In addition to one or more of the features described above, or as an alternative to any of the foregoing embodiments, the at least one parameter of the engine is a variable fan blade angle of at least one stage of an engine fan driven by the first shaft.

Also disclosed is a method for controlling at least one engine parameter of a gas turbine engine including measuring an output power of at least a first power extraction shaft of a gas turbine engine using a sensor physically disposed on the first power extraction shaft, synthesizing an instantaneous engine power output and engine efficiency of the gas turbine engine based on the measured output power, adjusting at least one engine parameter based on the synthesized instantaneous engine power output and engine efficiency.

In addition to one or more of the features described above, or as an alternative to any of the foregoing embodiments, the method includes measuring an output power of at least a second power extraction shaft of a gas turbine engine using a sensor physically disposed on the second power extraction shaft and synthesizing the instantaneous engine power output and engine efficiency of the gas turbine engine based on the measured output power from the first sensor and the second sensor.

In addition to one or more of the features described above, or as an alternative to any of the foregoing embodiments, the first power extraction shaft is one of a tower shaft interfaced with a high speed spool of the gas turbine engine and an aircraft mounted accessory shaft interfaced with a low speed spool of the gas turbine engine.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
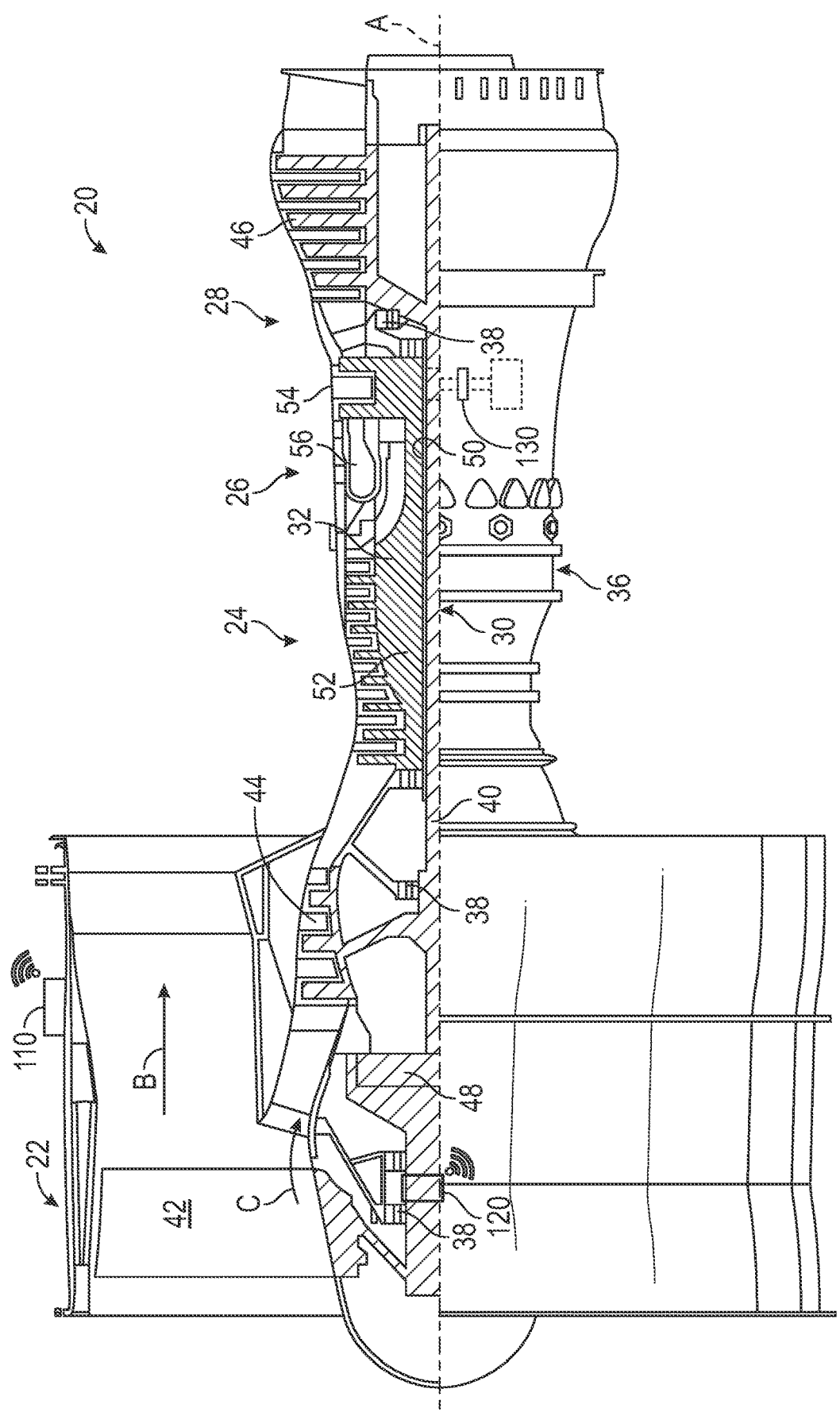
FIG. 1 is a partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°R)]^{0.5}$. The "Low corrected fan tip speed" as disclosed herein according to one non-limiting embodiment is less than about 1150 ft/second (350.5 m/sec).

In some examples, the engine 10 can include a full authority digital engine control (FADEC) within a controller 100. The controller 100 can be a single dedicated controller mounted to the fan casing as in the illustrated example, a software module contained within a general controller, a set of software modules distributed across multiple interconnected controllers, or any similar system capable of receiving signals, executing commands, and communicating signals to one or more additional systems.

Gast turbine engines, such as the engine 10, frequently include systems that extract power from one or more of the spools 30, 32 and provide the power to additional engine or aircraft systems.

In order to directly monitor the torque and horsepower extracted from the spools 30, 32, sensors 120, 130 are connected to extraction shafts extracting power from the spools 30, 32. The sensors 120, 130 are in direct communication with the FADEC 110. In the illustrated example, the communication is a wireless communication. In alternate examples, a wired communication can be utilized. In yet further alternate examples, a combination of wired and wireless communications can be used to transmit the sensor data to the FADEC 110. The FADEC 110 can then use the direct measured torque and/or horsepower to provide improved controls.

In one example, a software based control model operating on a FADEC on-board, uses the power extraction measured from the remote sensor(s) 120, 130 to calculate the impact to stall margin in real time. The stall margin can be calculated for the fan 42, when the sensor is positioned on the low speed spool 30, as in the example of sensor 120. Similarly, the stall margin can be calculated in real time for the compressor 52, when the power extraction measured is power extracted from the high speed spool 52. Furthermore, engine control algorithms within the FADEC 110 can be utilized to control angles of variable fan blades (of the fan 42) and variable angle vanes (of the compressors 44, 52) to drive the fan and/or compressors 44, 52 at a maximum efficiency operating condition for the pressure-flow condition of the turbomachinery while accounting for the magnitude of power extracted from corresponding spool(s) 30, 32.

When controlling compressor vanes to modulate the compressor variable vanes to a more optimal position, the measured extracted power is the power extracted from the high speed spool 32, which corresponds to the power extracted from the high speed turbine 54. When controlling fan blades to modulate the fan variable blades to a more optimal position, the power extraction measured from the low spool 30, corresponding to the low speed turbine 46 is used.

Figure 2:
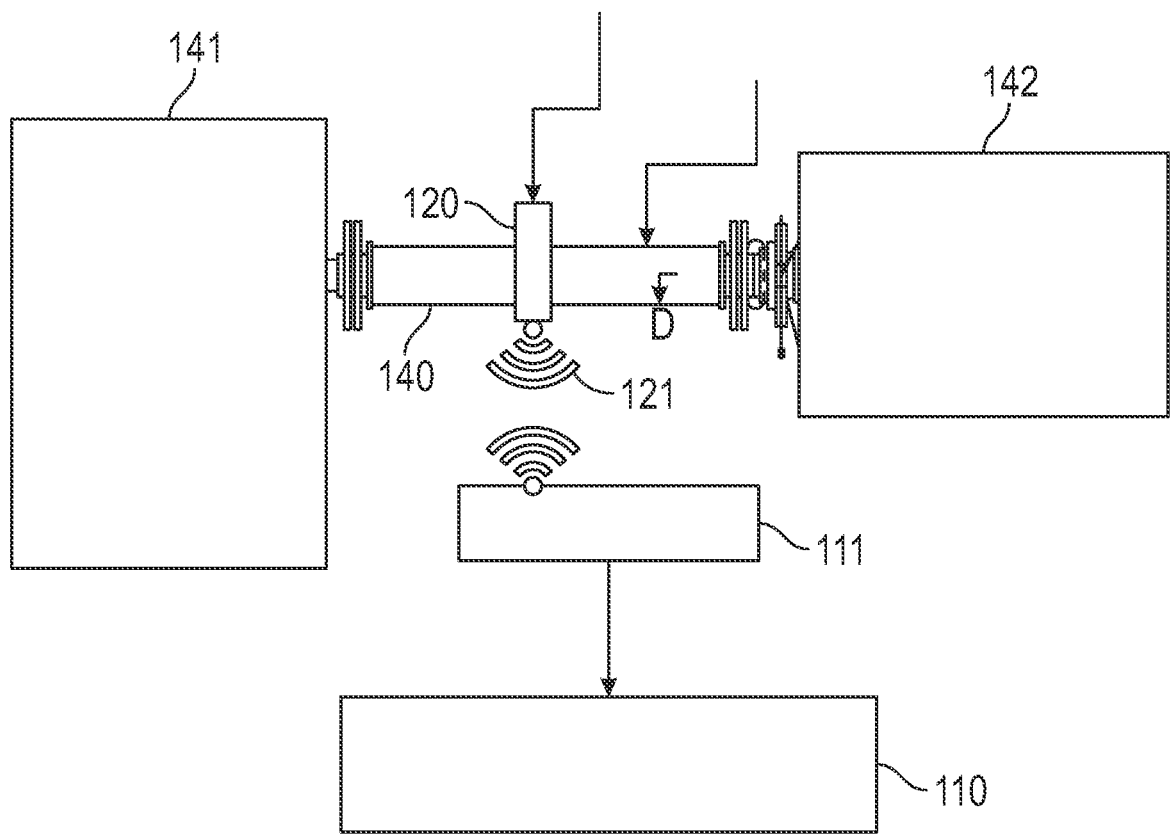
FIG. 2 is a schematic representation of an improved engine performance system used within the gas turbine engine of FIG. 1 according to a first example.

With continued reference to FIG. 1, FIG. 2 is a schematic representation of an improved engine performance system used within the gas turbine engine 10 of FIG. 1 according to a first example. In the example of FIG. 2 a power extraction shaft 140 is interfaced with the low speed spool 30 via an aircraft mounted accessory drive (AMAD) 141. The power extraction shaft 140 provides rotational power from the AMAD 141 to an engine mounted accessory drive (EMAD) 142, such as an engine gearbox. The EMAD 142 provides the rotational power to one or more powered systems within the gas turbine engine. By way of example, the EMAD 142 can provide power to generators, and pumps (hydraulic, fuel, and/or oil).

The first sensor 120 is physically disposed on (about) the power extraction shaft 140 and includes a wireless transmitter 121. The sensor 120 is, in one example, a combined torque and horsepower sensor able to measure an instantaneous torque and horsepower of the extraction shaft. This measured extraction power is transmitted in real time to the FADEC 110 using a wireless transmitter 121 portion of the sensor 120. The FADEC 110 includes software to synthesize power and control rules to improve the efficiency and operations of the engine. By way of example, the FADEC can synthesize control rules for reschedule vanes and/or nozzles within the gas turbine engine based on which shaft the power is extracted from. The FADEC 110 includes an onboard model (e.g., a mathematical algorithm modeling the engine power extraction using the measured values). The measured values can be sourced from any singular component attached to the extraction shaft 140, and the power to the remainder of the components could be synthesized, providing the full magnitude of engine power extraction. For example, the power take off to the an aircraft mounted accessory drive 141 from an engine gearbox could be measured, and the remainder of the components mounted to the engine gearbox synthesized to determine the total power extracted from the extraction shaft 140.

When the power extraction shaft 140 extracts power using an aircraft mounted accessory drive 141, the power may be pulled from the low speed spool and provides information regarding the operating efficiency of the fan 42 and the low pressure compressor 44. In these cases, the engine parameter that is modified to improve efficiency is a variable fan blade angle and/or a variable vane angle at one or more stages of the low pressure compressor 44.

Figure 3:
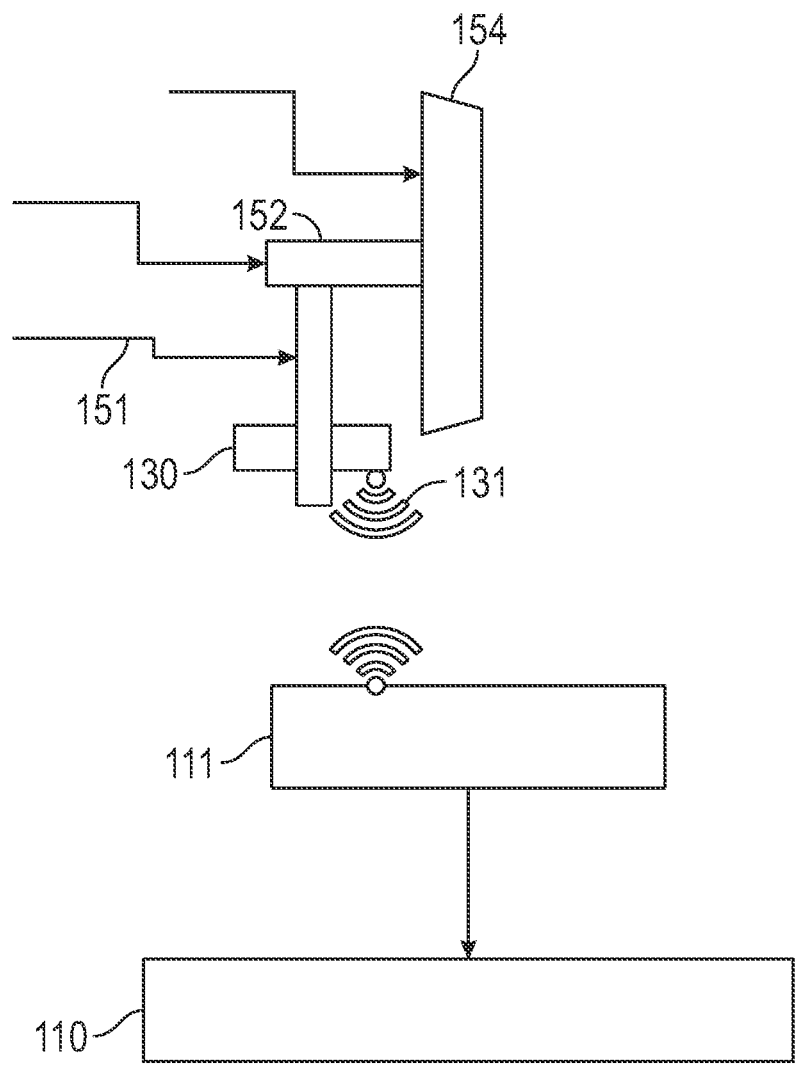
FIG. 3 is a schematic representation of an improved engine performance system used within the gas turbine engine of FIG. 1 according to a second example.

With continued reference to FIGS. 1 and 2, FIG. 3 illustrates a power extraction configuration using a tower shaft 151 interfaced with a turbine drive shaft 152, such as the high speed spool 32. The turbine drive shaft 152 is directly connected to a turbine section 154 such as the high pressure turbine 54. As with the example of FIG. 2, the sensor 130 is a horsepower/torque sensor mounted directly on the power extraction shaft (tower shaft 151) and includes a wireless transmitter 131 able to transmit the measured horsepower and/or torque (the extracted power) to a wireless receiver 111 of the FADEC 110 in real time. The FADEC 110 in turn uses the onboard model to identify parameter modifications that can improve engine operations based on the measured value. In examples where the power is extracted from the high speed spool 32/high pressure turbine 54, the model is able to reschedule vane angles of variable vanes within the turbines 52, 54 and nozzle positioning within the combustor 56 to improve performance.

Furthermore, while described separately above, it is appreciated that the systems of both FIG. 2 and FIG. 3 can be used simultaneously within a single engine, as shown in the example of FIG. 1, further increasing the detail that can be provided to the engine model within the FADEC 110 in real time and improving the modeling capabilities.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A sensor arrangement for a gas powered turbine comprising:
    at least one sensor disposed on a power extraction shaft and configured to output a measured power extraction of the power extraction shaft, wherein the power extraction shaft extracts power from at least one spool and provides the power to at least one additional engine system;
    a controller in communication with the at least one sensor, the controller including a memory and a processor, the memory storing instructions for causing the processor to respond to a received measured power extraction of the power extraction shaft by synthesizing an instantaneous engine power output from the measured power extraction and an engine efficiency from the measured power extraction and adjusting at least one parameter of the engine based on the synthesized engine power output and engine efficiency.

2. The sensor arrangement of claim 1, wherein the at least one sensor is disposed on a tower shaft, the tower shaft being interfaced with a turbine shaft of the gas powered turbine via a gear system.

3. The sensor arrangement of claim 2, wherein the at least one engine parameter includes a variable vane angle of at least one compressor stage.

4. The sensor arrangement of claim 1, wherein the at least one sensor is disposed on an aircraft mounted accessory drive shaft.

5. The sensor arrangement of claim 4, wherein the at least one engine parameter includes a variable blade angle of a plurality of fan blades in at least one stage of a fan of the gas powered turbine.

6. The sensor arrangement of claim 1, wherein the at least one sensor is at least one of a torque sensor and a horsepower sensor.

7. The sensor arrangement of claim 1, wherein the at least one sensor is in wireless communication with the power extraction shaft.

8. The sensor arrangement of claim 1, wherein the engine power is synthesized using a control model including inputs of at least one measured power extraction, the at least one measured power extraction being sourced from a singular component attached to the power extraction shaft, with a power extraction of a remainder of components extracting power via the power extraction shaft being synthesized.

9. The sensor arrangement of claim 1, wherein the gas powered turbine is a geared turbofan aircraft engine.

10. A gas powered turbine comprising:
    a primary fluid flowpath connecting a compressor section, a combustor section, and a turbine section, the compressor section including a first compressor and a second compressor, with the second compressor operating at a higher pressure than the first compressor, the turbine section including a first turbine and a second turbine with the second turbine operating at a higher pressure than the first turbine;
    a first shaft connecting the first compressor section with the first turbine section, such that rotation of the first turbine section drives rotation of the first compressor section;
    a second shaft connecting the second compressor section with the second turbine section, such that rotation of the second turbine section drives rotation of the first compressor section;
    a first power extraction shaft interfaced with one of the first shaft and the second shaft, such that rotation of the one of the first shaft and the second shaft is translated to the first power extraction shaft;
    a first sensor disposed on the first power extraction shaft and configured to monitor and output a measured power extraction of the first power extraction shaft, wherein the first power extraction shaft extracts power from the one of the first shaft and the second shaft and provides the extracted power to at least one additional engine system; and
    a controller in communication with the first sensor, the controller including a processor and a memory with the memory storing instructions for causing the processor to respond to a received measured power extraction of the first power extraction shaft by synthesizing an instantaneous engine power output from the measured power extraction and synthesizing an engine efficiency based on the measured power extraction of the first power extraction shaft and adjusting at least one parameter of the engine based on the synthesized engine power output and engine efficiency.

11. The gas turbine engine of claim 10, further comprising a second power extraction shaft, the second power extraction shaft being interfaced with the other of the first shaft and the second shaft such that rotation of the other of the first shaft and the second shaft is translated to the second power extraction shaft, and a second sensor disposed on the second power extraction shaft and configured to monitor and output a measured power extraction of the second power extraction shaft.

12. The gas turbine engine of claim 11, wherein synthesizing an instantaneous engine power output and engine efficiency is further based on the measured power extraction of the second power extraction shaft.

13. The gas turbine engine of claim 12, wherein the engine power is synthesized using a control model including inputs of at least one measured power extraction, the at least one measured power extraction being sourced from a singular component attached to the power extraction shaft, with a power extraction of a remainder of components extracting power via the power extraction shaft being synthesized.

14. The gas turbine engine of claim 12, wherein the first power extraction shaft is a tower shaft interfaced with the second shaft via a gear system.

15. The gas turbine engine of claim 14, wherein the first sensor is at least one of a torque sensor and a horse power sensor, and wherein the at least one parameter of the engine is a variable vane angle of at least one compressor stage in the compressor section.

16. The gas turbine engine of claim 12, wherein the first power extraction shaft is an aircraft mounted accessory drive shaft.

17. The gas turbine engine of claim 16, wherein the at least one parameter of the engine is a variable fan blade angle of at least one stage of an engine fan driven by the first shaft.

18. A method for controlling at least one engine parameter of a gas turbine engine comprising:
  measuring an output power of at least a first power extraction shaft of a gas turbine engine using a sensor physically disposed on the first power extraction shaft, wherein the first power extraction shaft extracts power from at least one spool and provides the power to at least one additional engine system;
  synthesizing an instantaneous engine power output from the measured power extraction and synthesizing an engine efficiency of the gas turbine engine based on the measured output power; and
  adjusting at least one engine parameter based on the synthesized instantaneous engine power output and engine efficiency.

19. The method of claim 18, further comprising measuring an output power of at least a second power extraction shaft of a gas turbine engine using a sensor physically disposed on the second power extraction shaft and synthesizing the instantaneous engine power output and engine efficiency of the gas turbine engine based on the measured output power from the first sensor and the second sensor.

20. The method of claim 18, wherein the first power extraction shaft is one of a tower shaft interfaced with a high speed spool of the gas turbine engine and an aircraft mounted accessory shaft interfaced with a low speed spool of the gas turbine engine.

* * * * *